United States Patent Office 3,782,963
Patented Jan. 1, 1974

3,782,963
METHOD OF VITAMIN COATING CEREAL PRODUCTS
Leroy F. Duvall and Charles D. Stone, Barrington, Ill., assignors to The Quaker Oats Company, Chicago, Ill.
No Drawing. Filed May 17, 1971, Ser. No. 144,347
Int. Cl. A23l 1/10, 1/30
U.S. Cl. 426—303                                  5 Claims

ABSTRACT OF THE DISCLOSURE

This invention relates to a process of vitamin coating cereal products and particularly to a new vitamin coating procedure for ready-to-eat breakfast cereals.

BACKGROUND OF THE INVENTION

Field of the invention

This invention relates to a process of making a vitamin coated ready-to-eat cereal product. More particularly this invention relates to a process for making a palatable vitamin coated cereal product.

Description of the prior art

Various methods for adding vitamins to ready-to-eat cereal products have been tried, and some of them are in use. Each of the methods used heretofore, however, has had certain disadvantages. For example, vitamins have been added to the cereal dough before it is cooked. The major difficulty with this process is that many of the vitamins, for example vitamin A, vitamine $B_1$, vitamin $B_{12}$, vitamin C, and vitamin D, are unstable and partially deactivate during the cooking step. Vitamin degradation is particularly undesirable because of the formation of distasteful odors and flavors, as well as the loss of vitamin activity.

To overcome some of the difficulties associated with mixing the vitamins into the uncooked dough, vitamins have been sprayed in an aqueous solution or oil emulsion on the surface of a cooked dough usually having a moisture content between about 25 and 35 percent. To reduce the moisture content of the cereal product, to provide the desired crispness, and to develop a desired flavor in the dough, the vitamin coated dough is subjected to an intensive heat transfer step. This heat transfer step is commonly referred to as "drying," "drying and toasting," "drying and puffing," or "drying, puffing, and toasting" depending upon the precise manner in which it is carried out. Hereinafter the step will be referred to as "drying." This process suffers from the same difficulties as the process wherein the vitamins are mixed in the uncooked dough. Namely, many of the more heat labile vitamins degrade during the drying step. Further shortcomings peculiar to this process are that there is a large material loss of vitamins during the spraying step due to "spray over" and that the distribution of vitamins on the cooked dough is customarily uneven.

Furthermore, as sufficient vitamins are added to the cereal product by the prior art processes to provide the adult minimum daily requirements or the recommended daily allowance established by the U.S. Food and Drug Administration, the ready-to-eat cereal product develops a decidedly and wholly undesirable medicinal flavor.

SUMMARY OF THE INVENTION

It is an object of this invention to provide a process for applying vitamins to a ready-to-eat cereal product whereby the more heat labile vitamins are not substantially deactivated.

Another object of this invention is to provide a process wherein there is a low material loss of vitamins.

Still another object of this invention is to provide a process whereby the vitamins are applied substantially evenly to the surface of the ready-to-eat cereal product.

An object of a preferred embodiment of this invention is to provide a process wherein the adult minimum daily requirements or the recommended daily allowance of vitamins can be added as a coating to the cereal product without producing an undesirable medicinal flavor.

The objects of this invention are accomplished by a process of producing a vitamin coated ready-to-eat cereal product which comprises the steps of:

(a) Precoating a precooked cereal having a moisture content between 0.5 and 30 percent by weight with an aqueous suspension or solution comprised substantially of sugar, said suspension or solution having a viscosity between 100 and 200,000 centipoises at 75° F.;

(b) Drying said precoated cereal until the moisture content thereof is between 0.5 and 3 percent by weight, and (c) Coating said dried cereal with vitamins while said cereal is hot and tacky, whereby said vitamins adhere to the tacky surface of said cereal.

The objects of this invention are further accomplished by the process described above wherein the vitamins are coated with a fatty composition which is a saturated aliphatic fatty acid having between 12 and 20 carbon atoms, inclusive, or a glyceride having the formula:

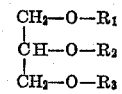

wherein $R_1$ is an acyl radical derived from a saturated aliphatic fatty acid having between 12 and 20 carbon atoms, inclusive, per molecule and $R_2$ and $R_3$ are hydrogen or the same as $R_1$.

In this application the words "precooked cereal having a moisture content between 0.5 and 30 percent by weight" are used in the same manner as in the prior art. The precooked cereal is prepared by any of the known processes, such as extrusion, puffing, or flaking. The grain in the precooked cereal may be for example, rice, wheat, oats, corn, barley, or any combination of two or more such grains. The precooked cereal may be formed into a variety of shapes and sizes by well-known techniques in the art. It is also to be understood that by "ready-to-eat cereal product" we mean cereal based products which are suitable for ready-to-eat snacks and breakfast cereals.

The aqueous suspension or solution is comprised substantially of sugar. The sugar may be any blend of mono-, di-, tri-, and other higher saccharides. For example, the sugar may be dextrose, lactose, sucrose, fructose, maltose, or combinations thereof; or any of the higher saccharides present in corn syrup and combinations thereof. The dextrose and lactose may be anhydrous, or hydrated in whole or in part. When the sugar is sucrose, it is prefered that the aqueous suspension comprise 50 to 90 percent by weight of sucrose and 50 to 10 percent by weight of water.

We have found it advantageous to heat the aqueous sugar mixture to just below 200° F. to bring about the partial dissolution of the sugar. The partially solubilized sugar in the aqueous mixture does not clog the spray head when the mixture is applied to the precooked cereal by spraying. The aqueous sugar mixture may be heated to temperatures above 200° F. to bring about complete dissolution of the sugar but we have not found this advantageous since the resultant syrup cannot be sprayed on the precooked cereal but must be applied by tumbling the cereal with the syrup.

The aqueous suspension or solution comprised substantially of sugar may additionally comprise salt, fats, flavorings, stabilizers, flavor enhancers, flavor potentiators, etc. For example, certain flavoring ingredients such as honey, chocolate, peanut butter, and fruit juice concentrate can be added to the aqueous suspension to modify or enhance the characteristic flavor of the cereal product.

The aqueous suspension or solution of sugar having a viscosity between about 100 and 200,000 centipoises is coated onto the precooked cereal. While the amount of aqueous suspension is not narrowly critical, the moisture content of the precoated precooked cereal before drying should be between 1 and 35 and therefore limits the amount of aqueous sugar suspension or solution of any given viscosity. The precoating can be accomplished by any known method, for example, by mixing and agitating the cereal with a quantity of the aqueous sugar suspension in an enrober or related device. The precoating can also be accomplished by spraying the aqueous suspension on tumbling precooked cereal in an enrober so that the aqueous suspension of sugar is distributed evenly around the product.

The precoated cereal is dried under temperatures and for times as is well known in the art depending primarily on the nature of the cereal piece and the amount and viscosity of the aqueous sugar suspension or solution. For example, with an aqueous solution of sugar which comprises 20 to 60 percent by weight of the cereal product after drying, the product requires a period of 3 to 15 minutes at a temperature of 200 to 400° F. These drying conditions are given by way of example. Drying temperatures lower than those specified above may of course be employed if desired. Drying is continued until the moisture content of the precoated cereal is between about 0.5 and 3 percent by weight.

After drying and while it is hot, the precoated cereal is coated with vitamins. While we do not wish to be bound to any theory we believe that the vitamins adhere to the hot cereal product in the glassy, sticky sugar. While the temperature of the dried precoated cereal product during the vitamin coating procedure is not narrowly critical, it should be sufficient to prevent crystallization of the sugar. Much higher temperatures than necessary to prevent crystallization of the sugar should be avoided to prevent deactivation of the heat labile vitamins. We have found that the precoated dried cereal may be coated with vitamins while the cereal is between about 120° and about 300° F. After coating the precoated dried cereal product with vitamins, the cereal product is immediately cooled and is ready for human consumption.

As sufficient vitamins are added to the cereal product to provide the adult minimum daily requirements or recommended daily allotments when consumed in an amount reasonably suited for adult consumption, the cereal develops an unpleasant medicinal taste. By practicing the preferred embodiment of this invention, high levels of vitamins may be added to the cereal by coating the vitamins with a fatty composition which is a saturated aliphatic fatty acid or a glyceride of the above formula without the development of an undesirable flavor. Furthermore, the fatty composition helps anneal the vitamins to the dried, hot cereal piece.

Suitable saturated aliphatic acids include for example, stearic acid, palmitic acid, myristic acid, and lauric acid, The saturated aliphatic fatty acid glyceride may contain between 0 and 2 hydroxy groups inclusive. The glycerides employed in the present invention furthermore need not be pure compounds, but can be glycerides for example from mixtures of the above mentioned saturated aliphatic fatty acids.

The vitamins are coated by suspending the particular vitamin in a molten fatty material and chilling the resulting suspension to produce spheroidal particles of the vitamin having a coating of the fatty composition. The coated vitamins may be blown through a small orifice to provide beadlets of vitamins the cross section of which is determined by the diameter of the orifice. Higher temperatures than necessary to form the suspension are preferably avoided to prevent deactivation of the heat labile vitamins. We have found that from about 0.05 to about 5 percent by weight based on the weight of the cereal product of the fatty composition is satisfactory in the preferred embodiment of our invention.

The vitamins thiamin (vitamin $B_1$), riboflavin (vitamin $B_2$), niacinamide, ascorbic acid (vitamin C) and cyanocobalamin (vitamin $B_{12}$), for example, may be coated with the above described fatty composition for use in accordance with the preferred embodiment of this invention. The coating of vitamin A, vitamin D, and vitamin E, with said fatty composition would not be advantageous since these vitamins are not sufficiently soluble in said fatty composition. Satisfactory and commercially available vitamins coated with said fatty composition are available from Merck & Company, Inc., Rahway, N.J., under the trademark "Mercote" and from Hoffmann-La Roche, Inc., Nutley N.J., under the trademark "Rocoat."

While vitamin A and vitamin D are not advantageously coated with said fatty composition, they are often dispersed in gelatin. The gelatin is designed to act as a protective medium to prevent oxidation thereof whereby the vitamins lose their vitamin activity. We prefer to use gelatin coated vitamin A and vitamin D in the process of our invention.

The vitamins useful in this invention are well known and commercially available. For example, vitamin A is commercially available as the acetate and palmitate derivative. Niacin is available as niacinamide and vitamin $B_6$ is available as pyridoxine hydrochloride. Vitamin C is available as sodium ascorbate and ascorbic acid. All the vitamins necessary to provide the minimum daily requirements are similarly readily available.

While the size of the particles of vitamins is not narrowly critical, they must be no larger than will adhere to the cereal piece. This size is dependent on the melting point of the fatty composition forming the coating if any, the geometry of the particle which need not be perfectly sperical, and the temperature of the dried cereal piece to which the vitamin particle is annealed. The maximum size can be easily determined by one skilled in the art by a few routine experiments. Examples of satisfactory particle sizes are set forth by way of example in the description of the preferred embodiments but said examples are clearly not intended to limit the scope of this invention.

DESCRIPTION OF THE PREFERRED EMBODIMENTS

The following embodiments of this invention are shown for the purpose of illustrating the invention and demonstrating the best mode for practicing the invention. It will be apparent to those skilled in the art that various changes and modifications may be made therein without departing from a spirit and scope of the invention as it is more precisely defined in the subjoined claims.

Example 1

50 pounds of a precooked cereal product having a moisture content of about 7 percent by weight was sprayed with an aqueous suspension comprised substantially of sugar which was prepared by mixing together 41 pounds of sucrose, 7 pounds of vegetable oil, 1 pound of salt, and 11 pounds of water. The components of the aqueous suspension were heated to 190° F. for 2 minutes and sprayed on the precooked cereal product while the cereal tumbled in an enrober. The precoated precooked cereal product was tumbled sufficiently to provide a uniform distribution of the aqueous sugar suspension around the precooked cereal pieces.

The precoated cereal product was then dried by use of a Proctor & Schwartz Laboratory model oven equipped with tray pans having a volume of approximately 3000 cubic inches and a bed depth of approximately 3 inches. The direction of air flow was upward through the product.

A temperature of 280° F. was maintained for 160 seconds. After the first 80 seconds elapsed, the tray was shaken vigorously to shatter clumps and redistribute the partially dried product in order to insure uniform drying. At the end of the drying period the moisture content of the dried cereal product was about 2.4 percent by weight.

While the dried cereal product was at a temperature of about 160° F. to 180° F. and the sugar coating still tacky, the cereal was tumbled with 2.7542 pounds of a vitamin pre-mix. The vitamin pre-mix was composed of 1.9830 pounds of confectioner's sugar and 0.7712 pound of a vitamin blend. Each pound of the vitamin blend was composed of vitamin A palmitate having an activity of 9.0720 M.U. (1 M.U.=1,000 I.U.) in combination with vitamin $D_2$ in gelatin having an activity of 0.9072 M.U., thiamine mononitrate having a glycerol monostearate waxy coat and perature of the cereal was about 250° F. and the sugar was still tacky.

Each pound of the vitamin pre-mix contained vitamin A palmitate having a gelatin coat and an activity of 3.024 M.U. in combination with vitamin $D_2$ having an activity of 0.3024 M.U., thiamine mononitrate having an activity of 0.7560 g., riboflavin having an activity of 0.9072 g., niacinamide having an activity of 7.5600 g., pyridoxine hydrochloride having an activity of 1.1340 g., sodium ascorbate 22.6800 g., vitamin $B_{12}$ having a gelatin coat and an activity of 1.6633 mg., and corn starch to make up the balance of the pound. The corn starch acts as a carrier

TABLE I

| Mesh size | Percent | | | | | | | | | | |
|---|---|---|---|---|---|---|---|---|---|---|---|
| | 10 | 20 | 30 | 40 | 50 | 60 | 70 | 80 | 90 | 100 | 200 |
| Vitamin A and $D_2$ combination | 100 | | 90 | | | 65 | | 25 | | | |
| Thiamine mononitrate | | | 100 | 90 | | 65 | | | | | 50 |
| Riboflavin | | | | | (Fine powder) | | | | | | |
| Niacinamide | | | 100 | 90 | | 65 | | | | | 50 |
| Pyridoxine hydrochloride | 99 | | | 90 | | 65 | | | | | 50 |
| Sodium ascorbate | | 100 | | | | | | | | | |
| Vitamin $B_{12}$ | | | | | | | 100 | | 98 | | | an activity of 2.2680 g., riboflavin having a stearic acid waxy coat and an activity of 2.7216 g., niacinamide having a stearic and waxy coat and an activity of 22.6800 g., pyridoxine hydrochloride having a stearic acid waxy coat and an activity of 3.4020 grams, sodium ascorbate having an activity of 68.0400 g., vitamin $B_{12}$ in gelatin and having an activity of 4.9900 mg., and corn starch to make up the balance to one pound. The percentage of the vitamin particles in the pre-mix passing through the given Standard U.S. Mesh sizes is given in Table I.

The vitamin coated cereal product was tumbled for 10 seconds after the addition of the vitamin pre-mix to insure even distribution of the vitamins on the surface of each cereal piece.

The vitamin coated ready-to-eat cereal product prepared by the above process had the minimum daily adult requirements of vitamins per 1 ounce serving of the product. More specifically on analysis it was found that there is at least 16 mg./lb. of thiamine; 480 mg./lb. of vitamin C; 6400 I.U./lb. of vitamin D; 64,000 I.U./lb. of vitamin A; 160 mg./lb. of niacin; 1912 mg./lb. of riboflavin; 24 mg./lb. of vitamin $B_6$; and 35.2 $\mu$.g./lb. of vitamin $B_{12}$. The product was also subjected to taste evaluation. A comparison of taste of the product obtained in accordance with the process of this invention, with the product obtained by conventional processes showed that the vitamin coated product produced by the process of this invention had a superior, non-medicinal flavor.

Example 2

97.2458 pounds of dried cereal prepared as above by precoating a precooked cereal product with an aqueous suspension comprised substantially of sugar was coated with 2.7542 pounds of a vitamin pre-mix while the temto insure even distribution of the vitamins over the cereal piece. The size of the vitamin particles is reported below in terms of the percentage of the particles passing through the given Standard U.S. Mesh sizes.

TABLE II

| Mesh size | Percent | | | | | | | | | | | |
|---|---|---|---|---|---|---|---|---|---|---|---|---|
| | 10 | 20 | 30 | 40 | 50 | 60 | 70 | 80 | 90 | 100 | 200 | 325 |
| Vitamin A and $D_2$ combination | 100 | | 90 | | | | | 25 | | | | |
| Thiamine mononitrate | | | | | | | | | | | | 100 |
| Riboflavin | | | | | | | | | | 99 | 97 | 95 |
| Niacinamide | | | | | | | | | | 95 | | 50 |
| Pyridoxine hydrochloride | | | | | | | | 99 | | | | 70 |
| Sodium ascorbate | | | 100 | | | | | | | | | |
| Vitamin $B_{12}$ | | | | | | | 100 | | 98 | | | |

The above example produces a product which is good tasting and highly nutritious.

The above examples clearly demonstrate the accomplishment of this invention. Example 1 demonstrates the preferred embodiment of our invention. By practicing the process as disclosed in this example, a ready-to-eat vitamin coated cereal product is obtained which provides the minimum adult daily requirements of vitamins without an undesirable medicinal flavor detectable by most consumers. The vitamins are not substantially deactivated by the process described in Example 1 and there is substantially no material loss of the vitamins, i.e., substantially all of the vitamins adhere to the cereal piece. Furthermore, the vitamins are evenly distributed over all of the cereal pieces.

In Example 2, the vitamins are not coated with a fatty composition composed of saturated aliphatic fatty acid or glyceride of a saturated aliphatic fatty acid. Substantially all of the vitamins which comprise one-third of the minimum adult daily requirements per 1 ounce serving adhere to the cereal piece. There is substantially no material loss of the vitamins and the vitamins are evenly distributed over the surface of the cereal pieces.

From the foregoing description we consider it to be clear that the present invention contributes a substantial benefit to the ready-to-eat cereal art by providing a new and useful process for making a vitamin coated cereal product.

We claim:
1. A process of producing a vitamin coated ready-to-eat cereal product which comprises the steps of:
 (a) Precoating a precooked cereal having a moisture content between 0.5 and 30 percent by weight with an aqueous suspension or solution comprised substantially of sugar, said suspension or solution having a viscosity between 100 and 200,000 centipoises at 75° F., (b) Drying said precoated cereal until the moisture content thereof is between about 0.5 and 3 percent and (c) coating said dried cereal with vitamins while said cereal is hot and tacky, whereby said vitamins adhere to the tacky surface of said cereal; said vitamins coated with a fatty composition comprising an aliphatic fatty acid having between 12 and 20 carbon atoms inclusive or a glyceride having the formula:

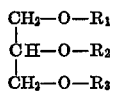

wherein $R_1$ is an acyl radical derived from an aliphatic fatty acid having between 12 and 20 carbon atoms, inclusive, per molecule and $R_2$ and $R_3$ are hydrogen or the same as $R_1$.

2. The process as in claim 1 wherein said fatty acid or glyceride comprises about 0.05 to about 5 percent by weight of the cereal product.

3. The process as in claim 1 wherein said precoated dried cereal is coated with vitamins while the cereal is between about 120° F. and about 300° F.

4. The process as in claim 1 wherein the aqueous suspension of sugar comprises 50 to 90 percent by weight of sucrose and 50 to 10 percent by weight of water.

5. The process as in claim 1 wherein the aqueous solution of sugar after the drying step comprises 20 to 60 percent by weight of the cereal product.

References Cited
UNITED STATES PATENTS

| | | | |
|---|---|---|---|
| 3,561,981 | 2/1971 | Roe et al. | 99—83 |
| 2,712,499 | 7/1955 | La Pierre | 99—11 |
| 3,037,911 | 6/1962 | Stoyle et al. | 99—11 X |

RAYMOND N. JONES, Primary Examiner

U.S. Cl. X.R.

426—311, 3, 454